Figure 6:
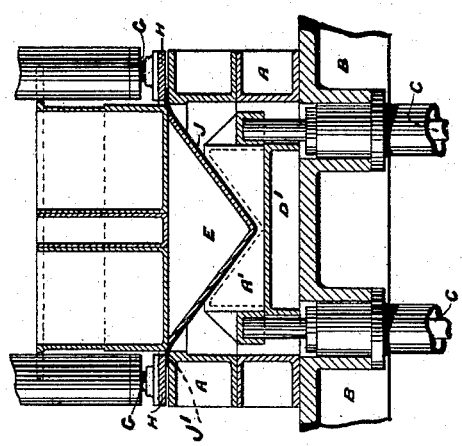

(No Model.) 7 Sheets—Sheet 1.
W. HESLOP.
MACHINERY FOR PRESSING BOATS FROM SHEET METAL.
No. 493,720. Patented Mar. 21, 1893.
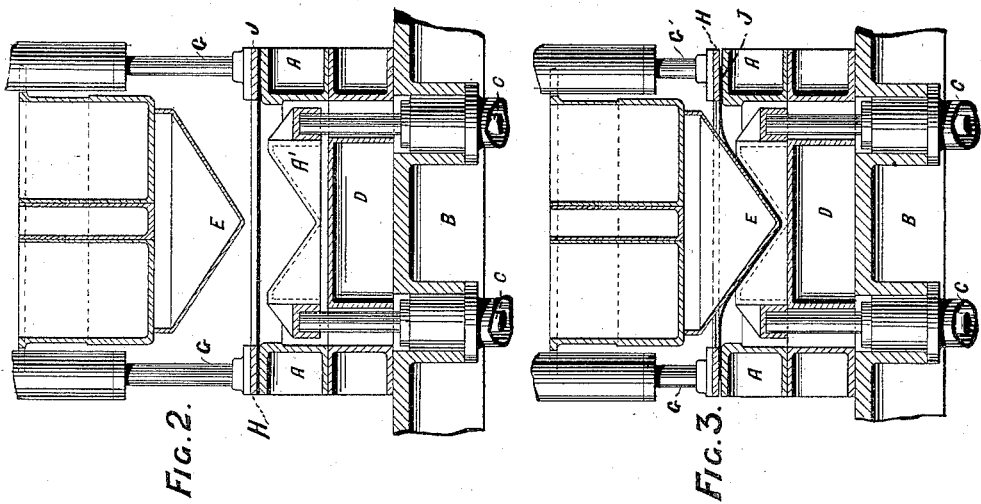
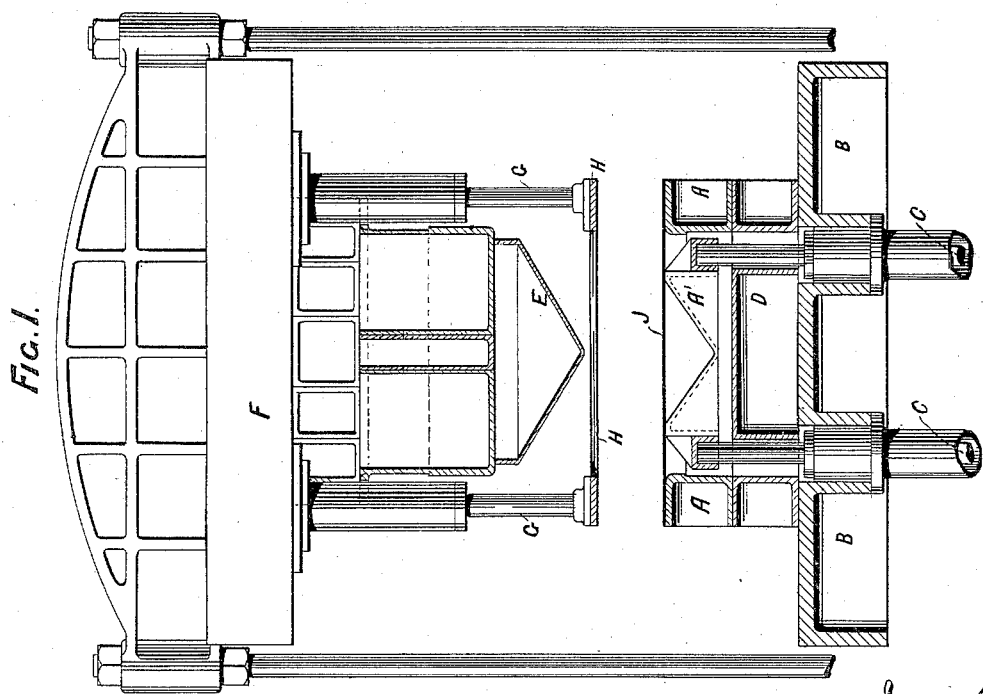
Witnesses
Chas. H. Smith
J. Staib
Inventor
William Heslop
per Lemuel W. Serrell
Atty.

(No Model.) 7 Sheets—Sheet 2.
W. HESLOP.
MACHINERY FOR PRESSING BOATS FROM SHEET METAL.

No. 493,720. Patented Mar. 21, 1893.

Witnesses
Chas. H. Smith
J. Staib

Inventor
William Heslop
per Lemuel W. Serrell
Atty.

THE NORRIS PETERS CO., PHOTO-LITHO., WASHINGTON, D. C.

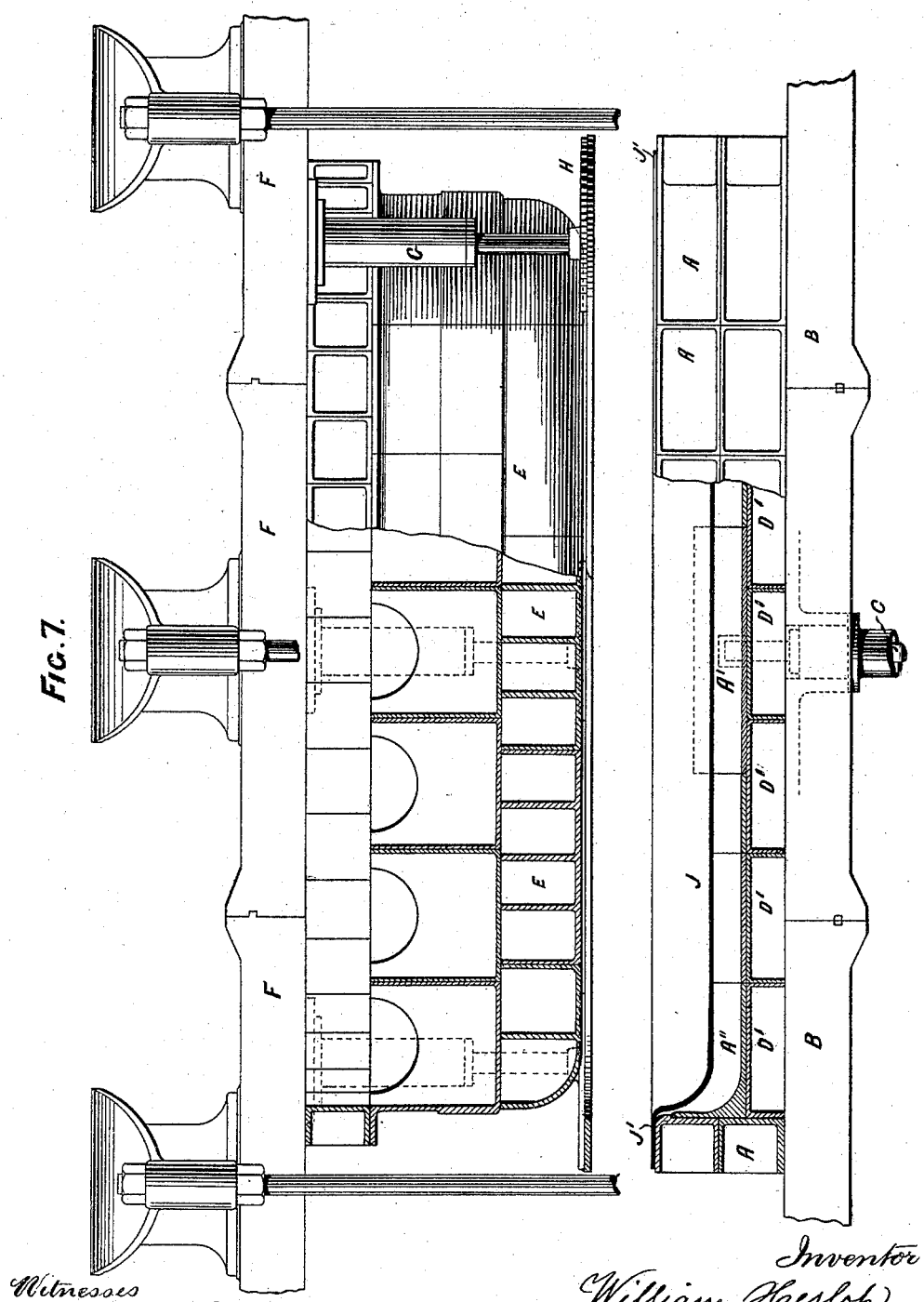

(No Model.)　　　　　　　　　　　　　　　7 Sheets—Sheet 4.
W. HESLOP.
MACHINERY FOR PRESSING BOATS FROM SHEET METAL.
No. 493,720.　　　　　　　　Patented Mar. 21, 1893.
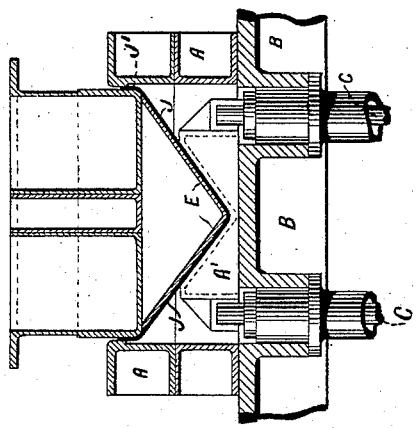
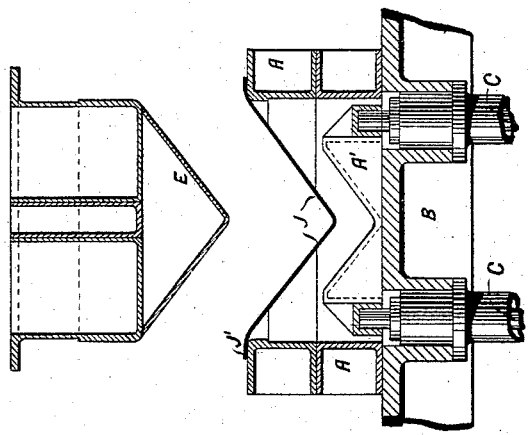
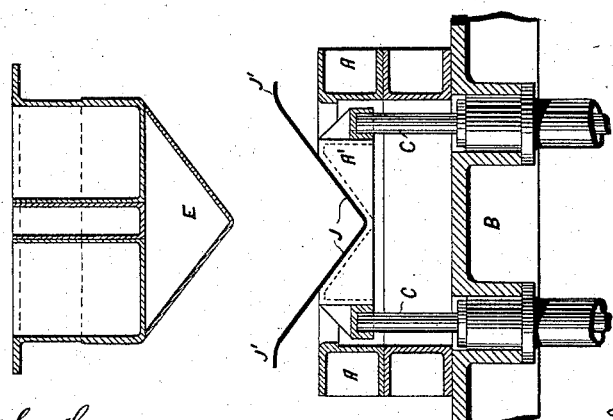

(No Model.) 7 Sheets—Sheet 5.

W. HESLOP.
MACHINERY FOR PRESSING BOATS FROM SHEET METAL.

No. 493,720. Patented Mar. 21, 1893.

Witnesses
Chas H. Smith
J. Staib

Inventor
William Heslop
per Lemuel W. Serrell
Atty.

(No Model.) 7 Sheets—Sheet 6.

W. HESLOP.
MACHINERY FOR PRESSING BOATS FROM SHEET METAL.

No. 493,720. Patented Mar. 21, 1893.

Witnesses
Chas. H. Smith
J. Stait

Inventor
William Heslop
per Lemuel W. Serrell
Atty

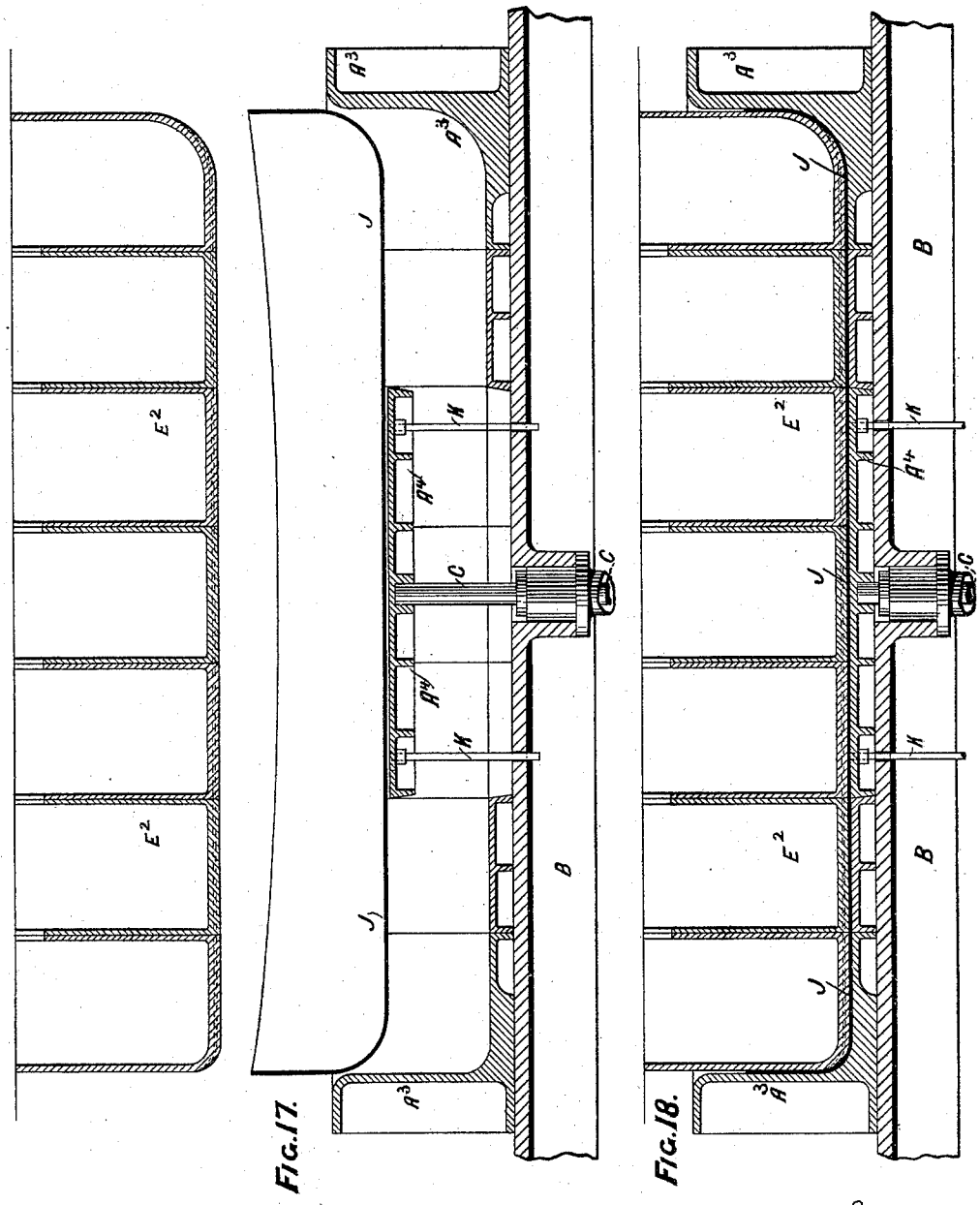

UNITED STATES PATENT OFFICE.

WILLIAM HESLOP, OF WAKEFIELD, ENGLAND.

MACHINERY FOR PRESSING BOATS FROM SHEET METAL.

SPECIFICATION forming part of Letters Patent No. 493,720, dated March 21, 1893.

Application filed May 2, 1892. Serial No. 431,491. (No model.)

*To all whom it may concern:*

Be it known that I, WILLIAM HESLOP, a subject of the Queen of Great Britain, residing at Wakefield, in the county of York, England, have invented certain new and useful Machinery for Pressing Boats from Sheet Metal, of which the following is a specification.

The pressing of metal plates between male and female dies with the object of causing the said plates to assume various forms and shapes is well known.

In my present improvements the dies employed are made in sections, put together into groups forming top and bottom dies, and the groups of sections forming the first pair of dies are used to press a flat sheet while in a heated condition into a partially formed blank of a V shaped cross section, the edges of the sheet being held out flat, but they are allowed to draw in during the operation. Changeable packing pieces are used with the lower die sections and these are removed so that the heated boat blank can be pressed still deeper during the second operation; usually a third pressing operation is performed upon the reheated boat blank by another pair of dies formed of sections grouped together so as to press the boat blank still deeper and draw the edges of the sheet metal out from beneath the holding-down-plates, and in between the dies. The proper shape is given to the reheated V shaped boat blank by dies that are rounded and of the form of the finished boat, the keel being pressed up along the apex of the V shaped boat blank.

With reference to the drawings hereinafter particularly referred to, I have shown four pressing operations for manufacturing the said boats, and in the first three operations similar dies are employed, movable filling pieces within the female die being changed for lower ones at each different operation, that is to say, the lower die is deepened after the first operation to be ready for the second, and deepened after the second operation to be ready for the third. In the fourth or finishing operation I employ a different set of dies to those employed for the first three operations. In the above three operations the plate is gradually pressed to the shape required, and on being placed in the fourth or finishing dies, the said plate is pressed to the final shape of boat. The edge of the plate which is to form the boat, is prevented from buckling during the various pressing operations, and such plate is received and pushed out of the lower die by apparatus all as hereinafter described.

In the drawings similar letters refer to like parts in all the figures.

Figure 5:
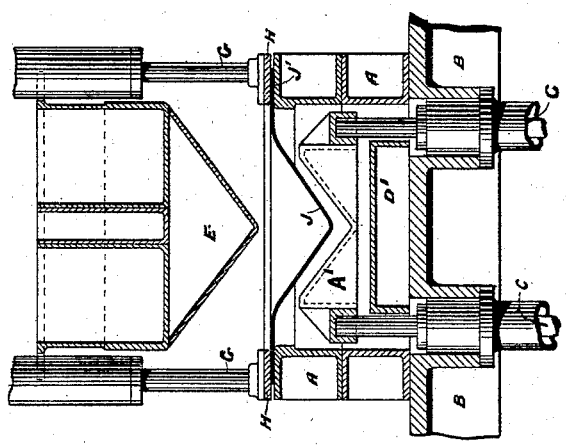
Figure 4:
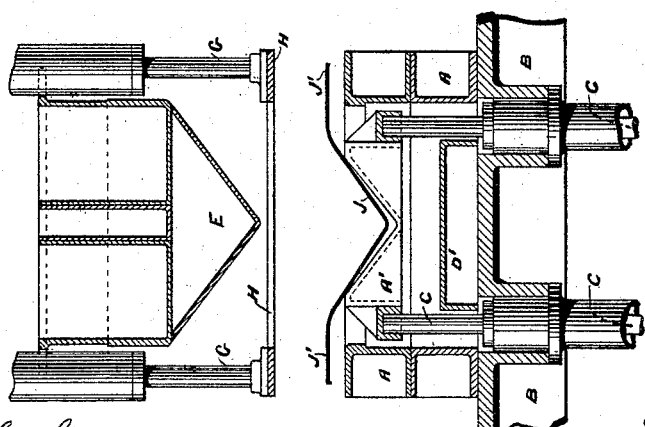
Figure 11:
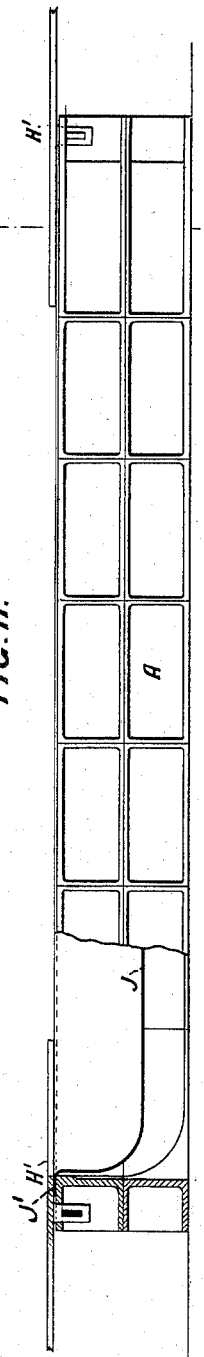
Figure 12:
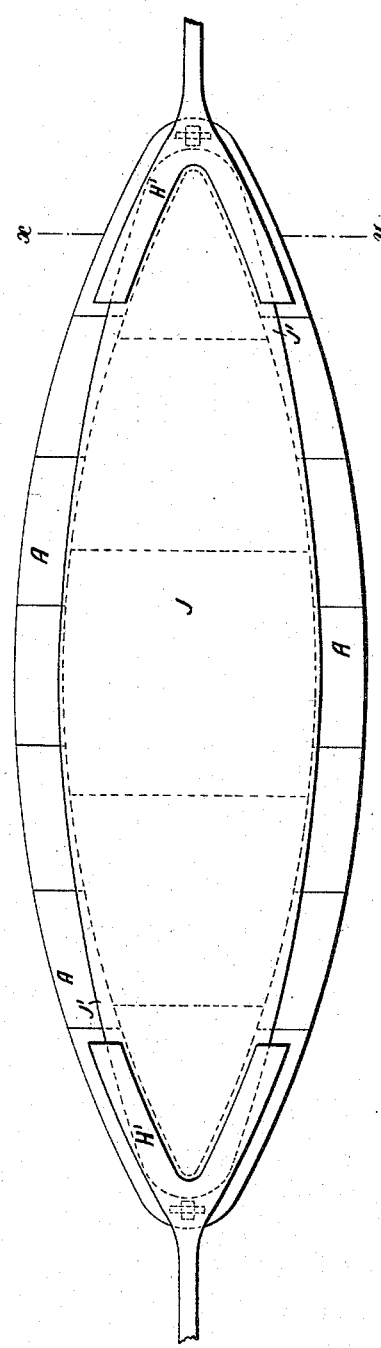
Figure 13:
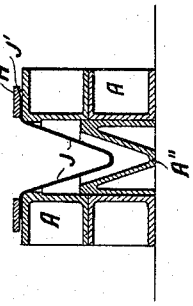
Figure 16:
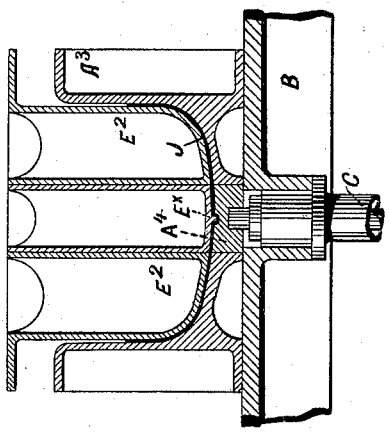
Figure 15:
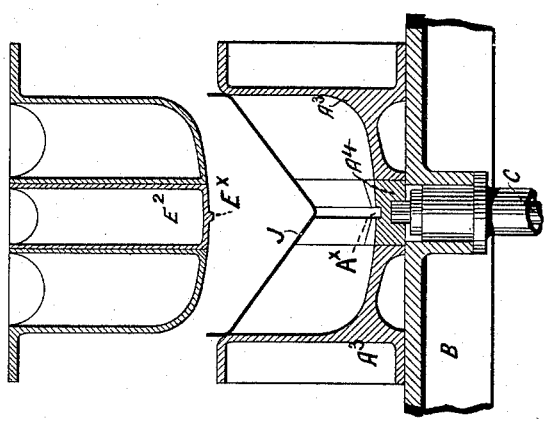
Figure 14:
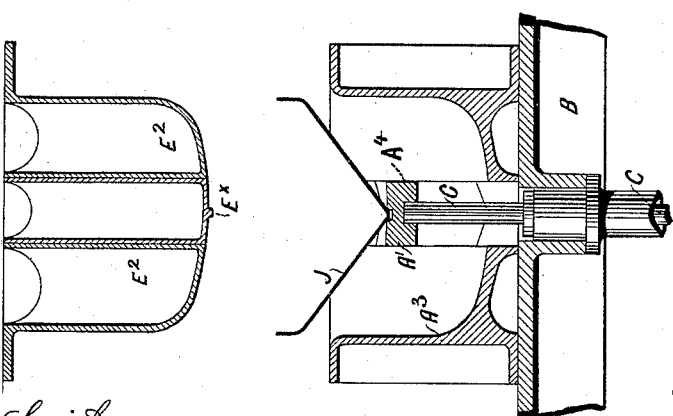

Figures 1, 2 and 3 are cross sections of dies constructed according to my invention showing the stages of the first pressing operation. Figs. 4, 5 and 6 are cross sections, and Fig. 7 is a side elevation partly in section, showing the stages of the second operation. Figs. 8, 9 and 10 are cross sections, and Figs. 11 and 12 are respectively part sectional elevation and plan of same, and Fig. 13 is a cross section taken on line X Y of Fig. 12, all showing the stages of the third operation. Figs. 14, 15 and 16 are cross sections of the finishing dies employed during the fourth or final operation, and Figs. 17 and 18 are longitudinal sections of same.

A is the lower or female die constructed of any suitable number of sections which are bolted together and mounted upon the rising table B of the press. The said die A has a movable lower section A' mounted on the upper extremities of two hydraulic or other rams C situated in the rising table B of the press. The said section A' is prevented descending beyond a given distance by the packing pieces D, extending along the full length of the lower or female die A, and these packing pieces D also support the sections A", best seen at Fig. 7.

E is the upper or male die which is fastened to the stationary head F of the press, and may be made up of any desired number of sections. Around this die E I provide hydraulic or other rams G, six of which are shown, and these rams suspend at their lower ends a holding down plate H. H' are auxiliary holding down plates seen at Figs. 11, 12 and 13.

J is the sheet metal plate to be operated upon, and J' Figs. 3 and 4 is a flange which is formed on same during the first operation, but which disappears after the third operation as hereinafter described. The dies forming the finishing press are similar in construction to those described with reference to Figs. 1 to 13. The central movable section A' Figs. 17 and 18, is provided with guide bars K K, for guiding the said movable central section A'.

The manufacture of boats by means of dies constructed according to my invention is effected as follows: The plate J to be operated upon is heated by or in any suitable furnace and then laid on the lower or female die A as at Fig. 1 and at this time the section A' of the lower die is raised on its two rams C, preventing the plate bending down into the center of the die, as it would otherwise do by reason of its weight when heated. The table B is now raised carrying with it the die A and on the said table arriving at the position shown at Fig. 2 the holding down plate H comes into contact with and clamps or presses the plate J between itself and the outer top edge of the lower die A. The section A' is now lowered and the table B continuing to rise forces back the rams G, which being acted upon by the required pressure keeps the holding down plate H on the edges of the plate J so as to prevent the said edges of the plate J buckling as would otherwise be the case while the plate was drawn inward, the dies finally coming together as is shown at Fig. 3 and thus completing the first operation. The table B is now lowered and the packing pieces D, Figs. 1, 2 and 3 which have during this first operation supported the lower sections of the lower die are now removed, being replaced by packing pieces D' of less height see Figs. 4, 5, 6 and 7 to enable the plate J to be pressed deeper into the lower die at the next operation. The plate J being reheated and supported by the section A' as shown at Fig. 4, the table B is again raised, the holding down plate H clamping the edges J' of the plate J as shown at Fig. 5, when the section A' is lowered. In this second operation the table B rises higher and the upper die E enters deeper into the lower die A by reason of the lesser height of the packing piece D', as shown at Fig. 6, thus completing the second operation. On the table B being lowered the edge J' of the plate J will be found to be almost all drawn in at the sides, though at the ends viz the stem and stern there will still be a considerable amount of edge J' left. The packing pieces D' are now removed and the several sections A' A'' forming the base of the lower die are replaced and rest directly upon the table B. The rams G and holding down plate H are also removed and the plate J having been suitably reheated and placed in position as at Fig. 8 is then lowered to that shown at Fig. 9 the auxiliary holding down plates H' situated at either end of the lower die are applied as shown at Figs. 11, 12 and 13, and these hold the edge J' of the plate J at the stem and stern parts. The table B is now raised causing the die E to enter the die A, which presses the plate J deeper and more into the required shape, causing the edge J' to turn up as shown at Fig. 10, at the same time drawing the ends of the plate J from under the auxiliary holding down plates H' Fig. 12 so leaving the entire edge of the plate J turned upward and completing the third operation. The entire dies are now changed and upper and lower dies $E^2$ and $A^3$ are employed as shown at Figs. 14, 15, 16, 17 and 18. The plate J having been suitably heated is inserted in the die $A^3$ as shown at Fig. 14, the central section $A^4$ being raised on its ram C ready to receive the said plate J. The table B is then raised and the central section $A^4$ being lowered simultaneously therewith as shown at Fig. 15. The table B continues to rise until the dies are together with the plate J between them as shown at Fig 16 whereby the plate J is finally pressed to the form required the outwardly projecting keel being formed by the projection $E^x$ on the upper die forcing the plate into the recess $A^x$ on the lower die. The table B being now lowered, the center section $A^4$ is raised on its ram C lifting the finished boat from the lower die $A^2$ from which it can be removed by any suitable means.

Although I have described the manipulation of the machinery constructed according to my invention when four separate operations are performed therewith it is obvious that three operations might be sufficient or even two, or I might even find it necessary in some instances to reheat and press the plate more than four times in the said dies.

The hydraulic rams C and G are of any desired or ordinary construction and are projected by the pressure of a fluid admitted to the respective cylinders; or by allowing the fluid to escape from such cylinders the rams and parts therewith connected are allowed to receive the movements hereinbefore set forth.

The hydraulic or other competent mechanism to act upon the bed or table B is not represented in the drawings.

I claim as my invention—

1. The combination in mechanism for pressing boats of an upper die and a lower die adapted to give the shape required for the boat, the lower die having a movable central section, a holding down plate for the edges of the sheet while being pressed, and rams for actuating the respective parts, substantially as specified.

2. The combination in mechanism for pressing boats of an upper die and a lower die adapted to give the shape required for the boat, the lower die having a movable central section, a holding down plate for the edges of the sheet while being pressed, changeable packing pieces for supporting the lower die sections during the different operations, and rams for actuating the respective parts, substantially as specified.

3. The combination in machinery for pressing boats of the head or supporting plate F. the sectional male die E connected therewith, the holding down plate H. the sectional female die A the rising table B. on which said die A. is mounted, the central movable die section A'. and the rams for actuating the respective parts substantially as specified.

WILLIAM HESLOP.

Witnesses:
 GRIFFITH BREWER,
 JOHN JOWETT.